Feb. 11, 1930.  A. S. VALENTINE  1,746,975
ANIMAL RACING APPARATUS
Filed Jan. 25, 1928
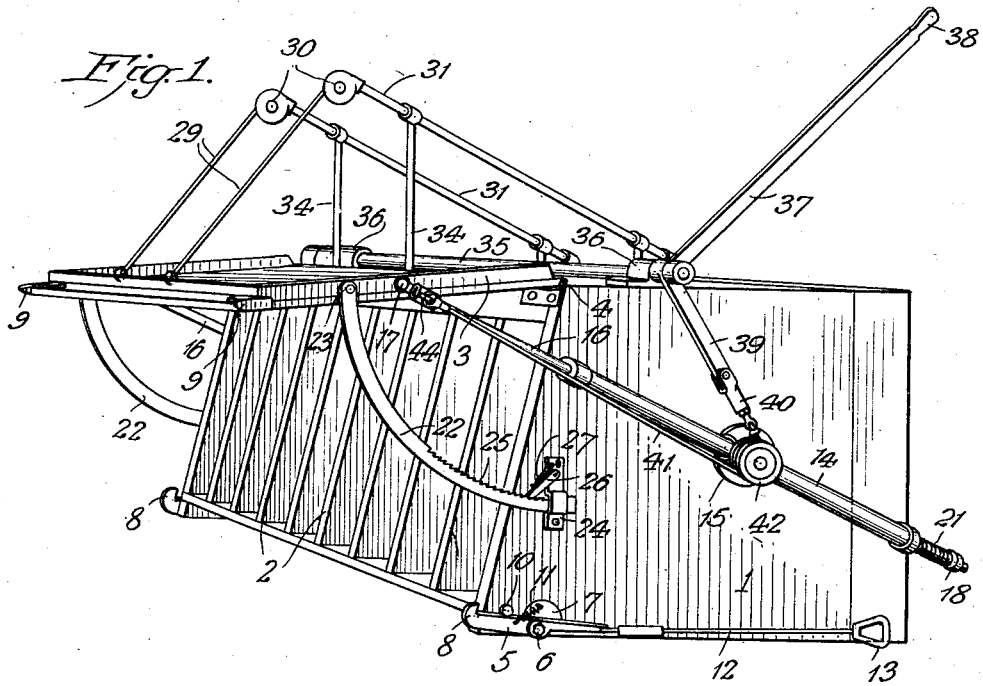
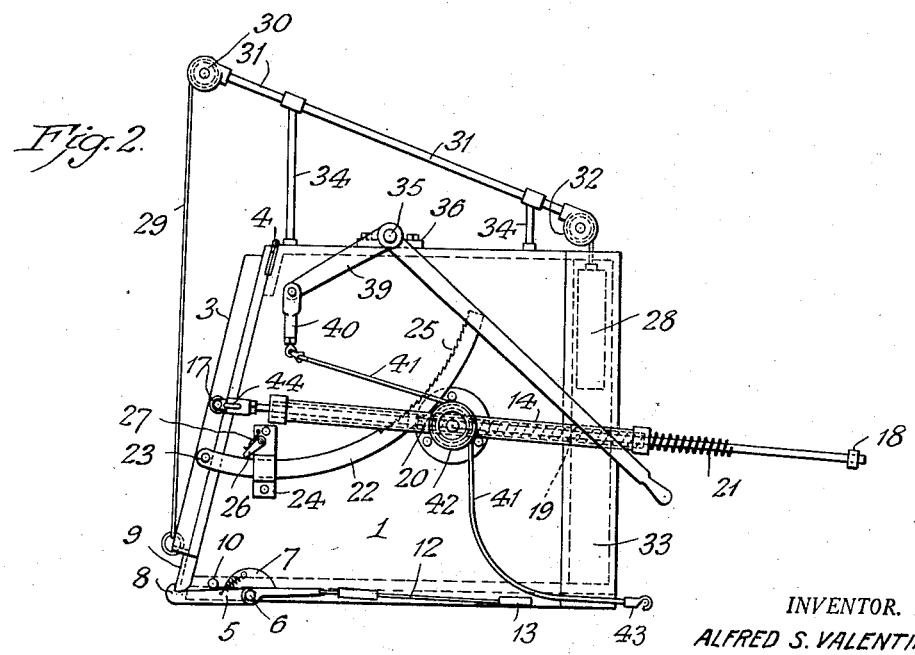
INVENTOR.
ALFRED S. VALENTINE.
BY Sheffield & Betts,
HIS ATTORNEYS.

Patented Feb. 11, 1930

1,746,975

UNITED STATES PATENT OFFICE

ALFRED S. VALENTINE, OF BROOKLYN, NEW YORK

ANIMAL-RACING APPARATUS

Application filed January 25, 1928. Serial No. 249,442.

This invention relates in general to animal racing apparatus and more particularly to the starting box in which the dogs or other animals engaging in the race are housed immediately before the start of the race.

In order that the dogs may obtain a fair start for the race, they are housed in a starting box until the race is ready to begin, at which time the front door of the box is opened and all of the dogs are permitted to dash out simultaneously.

The principal object of the present invention, therefore, is to provide a starting box adapted to house the dogs and which is provided with a front door that may be quickly and easily opened in such a manner as to release the dogs simultaneously.

Further objects of the invention are to provide means for holding the front door of the box open, and means for closing the door when it is so desired.

Further objects of the invention will be apparent from the following description and from the drawing in which Fig. 1 is a perspective view of a starting box embodying the subject matter of the present invention, showing the front door open and the means for closing the door attached thereto, and Fig. 2 is a side elevational view showing the door closed and the door-closing means disconnected from the door.

In the drawing, the numeral 1 indicates a starting box adapted to house the dogs until the start of the race, preferably having its front face inclined at a slight angle as shown and divided into a plurality of stalls for the dogs by means of the partitions 2 and provided with a front door 3 hinged to the top of the box as indicated at 4.

The front door 3 is held closed by means of the latches 5 connected to the ends of a transverse rod 6 extending across the bottom of the box and projecting slightly beyond the supporting brackets 7 fastened on the side of the box as shown. The forward ends of the latches 5 are provided with projections 8 adapted to contact with the members 9 fastened on the door 3 at the lower corners thereof. The members 9 may be, and preferably are, pieces of iron secured to the door and projecting slightly below its lower edge. The forward ends of the latches 5 are normally urged upward against the lower edge of the door 3 by springs 11 connected to the latches 5 and to the brackets 7. When the door 3 is open, the upward movement of the latches 5 is restricted by the stops 10 in the side of the box. To release the door 3, the forward ends of the latches 5 are depressed by means of a connecting member 12 fastened to the rear end of one of the latches and provided with a handle 13 as shown.

The means preferably employed to open the front door 3 after the latches 5 have been released may be described as follows. Cylinders 14 are pivotally supported at substantially the mid-point of their length by brackets 15 bolted or otherwise fastened to the sides of the starting box. Plungers 16 extend through the cylinders 14 and are pivotally connected to the front door as indicated at 17 and are provided at their opposite ends with collars 18, preferably formed integral therewith. Springs 19 located within the cylinders 14 and coiled about the plungers 16 abut against the rear end of the cylinders and against collars 20 on the plungers and normally urge the plungers outward thus forcing the door 3 open when the latches 5 are released. In order to limit the opening movement of the door, buffer springs 21 are mounted on the plungers 16 between the ends of the cylinders 14 and the collars 18.

Arcuate members 22, adapted to hold the door 3 open, are connected to the door as indicated at 23 and slide through guides 24 fastened to the sides of the box. Each of the members 22 is provided with a series of notches 25 with which a pawl 26 pivoted on the guide 24 is adapted to engage. The pawl 26 may be, and preferably is, normally urged against the member 22 by a spring 27.

Counterweights 28 are provided to assist the plungers 16 in opening the door 3 and to help the members 22 hold it open. Ropes 29, connected to the door 3 near its lower edge as shown, pass over the pulleys 30, through the pipes 31, over the pulleys 32 and are connected to the counterweights 28. If desired, the counterweights may be housed in a separate compartment 33 at the rear of the starting box. The pipes 31 are conveniently supported by means of the standards 34.

The closing of the door 3 against the action of the springs 19 is accomplished by means of the following construction. A rod 35, supported by the bearings 36 extends across the top of the box and has connected at one end a lever 37 provided with a suitable handle 38. Arms 39 are securely mounted on the rod 35 and are pivotally connected to links 40. Flexible cables or ropes 41 are connected to the links 40 and after passing over pulleys 42, supported by the brackets 15, are removably connected to the end of the plungers 16. This removable connection is preferably obtained by means of hooks 43 at the end of the cables 41 which are adapted to be connected to screw-eyes 44 at the end of the plungers 16. It will be observed from Fig. 1 that the length of the flexible cables or ropes 41 is such that when they are connected to the end of the plungers 16, the lever 37 is in the inclined position shown in this figure. As will be clearly seen from the drawing the pulleys 42 are positioned rearwardly of the transverse rod 35, so that when the lever 37 is pulled down, considerable tension will be applied in the cables 41.

When the lever 37 is pulled down after the pawls 26 have been released from the members 22, the plungers 16 will be forced into the cylinders 14 against the action of the springs 19, thus closing the door 3 which is held closed by the latches 5 as described above. After the door 3 has been closed the cables 41 are disconnected from the plungers 16 to prevent the handle 37 from flying upward when the door is opened.

Having thus described this form of the invention, it is not to be understood that it is limited to the detail of form or the precise arrangements of the parts set forth, for various changes may be made by those skilled in the art without departing from the spirit and scope of the invention as defined in the appended claims.

What is claimed and desired to be protected by Letters Patent is:

1. An animal starting box comprising, a door for said box, releasable means for holding said door shut and means adapted to open said door when said first means are released comprising, a cylinder pivotally mounted on said box, a plunger pivotally connected to said door and extending through said cylinder and adapted to reciprocate therein, the end of said plunger opposite said pivoted end being provided with a collar, a spring positioned within said cylinder and adapted to urge said plunger outward to open said door, a spring located on said plunger between said collar and said cylinder to restrict the opening movement of said door, and means to carry said door to its highest position.

2. An animal starting box comprising, a door for said box, releasable means for holding said door shut, means adapted to open said door when said first means are released comprising a spring-actuated plunger connected to said door and a lever having a connection with said plunger for closing said door.

3. An animal starting box comprising, a door for said box, releasable means for holding said door shut, means adapted to open said door when said first means are released comprising, a spring-actuated plunger connected to said door and a lever mounted on said box and a cable adapted to be connected between said lever and said plunger for closing said door.

4. An animal starting box comprising, a door for said box, releasable means for holding said door shut, means adapted to open said door when said first means are released comprising, a spring-actuated plunger connected to said door and means for closing said door comprising, a lever mounted on said box, a pulley mounted on said box rearwardly of said lever and a cable adapted to pass over said pulley and be connected between said lever and said plunger.

5. An animal starting box comprising, a door for said box, releasable means for holding said door shut, means adapted to open said door when said first means are released comprising, a spring-actuated plunger connected to said door, means for holding said door open and means for closing said door comprising a lever mounted on said box, a pulley mounted on said box rearwardly of said lever, and a cable adapted to pass over said pulley and be connected between said lever and said plunger.

6. An animal starting box comprising, a door for said box, releasable means for holding said door shut, means adapted to open said door when said first means are released comprising, a spring-actuated plunger connected to said door, an arcuate member having notches therein, a pawl adapted to engage in said notches to hold said door open, means for closing said door comprising a lever mounted on said box, a pulley mounted on said box rearwardly of said lever, and a cable passing over said pulley adapted to be connected between said lever and said plunger and a counterweight connected with said door and adapted to raise said door to its highest position.

7. An animal starting box, comprising, a door for said box, releasable means for holding said door shut, means adapted to open said door when said first means are released, and a bell-crank lever for closing said door having one arm provided with a detachable connection in alignment with said opening means.

ALFRED S. VALENTINE.